US006211278B1

(12) United States Patent
Vanel

(10) Patent No.: US 6,211,278 B1
(45) Date of Patent: Apr. 3, 2001

(54) COMPOSITION INTENDED FOR THE MANUFACTURE OF TIRE CASING WITH AN ELASTOMERIC BASE CONTAINING OXYGENATED FUNCTIONS AND SILICA AS FILLER

(75) Inventor: Robert Vanel, Clermont-Ferrand (FR)

(73) Assignee: Compagnie Generale des Etablissements Michelin-Michelin & Cie, Cedex (FR)

( * ) Notice: Subject to any disclaimer, the term of this patent is extended or adjusted under 35 U.S.C. 154(b) by 0 days.

(21) Appl. No.: 09/186,549

(22) Filed: Nov. 5, 1998

(30) Foreign Application Priority Data

Nov. 10, 1997 (FR) .................................................... 97 14211

(51) Int. Cl.$^7$ ....................................................... C08K 3/00
(52) U.S. Cl. ............................................. 524/492; 524/493
(58) Field of Search ..................................... 524/492, 493

(56) References Cited

U.S. PATENT DOCUMENTS 5,462,979 * 10/1995 Sandstrom ............................ 523/438
5,985,953 * 11/1999 Lightsey et al. ..................... 523/212

FOREIGN PATENT DOCUMENTS 0795577  9/1997 (EP) .
0799854  10/1997 (EP) .

OTHER PUBLICATIONS

Bandyopadhyay et al., Interaction Between Carboxylated Nitrile Rubber and Precipitated Silica: Role of (3–Aminopropyl) Triethoxysilane, pp. 637–647, Mar. 1993.
Chemical Abstracts, vol. 118, No. 10, Abstract No. 82602, Jiang, B. et al., "Studies of Interface States Between Natural Rubber/Butadiene Rubber Blend and Silica", p. 1, 1992.

* cited by examiner

*Primary Examiner*—Edward J. Cain
(74) *Attorney, Agent, or Firm*—BakerBotts L.L.P.

(57) ABSTRACT

A rubber composition intended for the manufacture of tire casings and elastic bearings for vehicle suspension systems, with elastomeric base containing oxygenated functions reinforced with a majority of silica-type filler, whose hysteretic properties are improved by use of a combination of an aminoalkylalkoxysilane with an alkylalkoxysilane, particularly for use in the tread of tire casings for trucks, construction and farm vehicles or airplanes.

19 Claims, No Drawings

COMPOSITION INTENDED FOR THE MANUFACTURE OF TIRE CASING WITH AN ELASTOMERIC BASE CONTAINING OXYGENATED FUNCTIONS AND SILICA AS FILLER

BACKGROUND OF THE INVENTION

The present invention relates to rubber compositions and, in particular, rubber compositions intended for the manufacture of tire casings and elastic bearings for vehicle suspension systems, and particularly to rubber compositions used in the tread of tire casings for trucks, construction and farm vehicles or airplanes.

The compositions of treads for tire casings are generally made by incorporating a reinforcing filler, such as carbon black, in one or more elastomers. In the case of tire casings which must withstand heavy loads or roll at high speed, there is an intense release of heat and the tire casings are subjected to high temperatures. This temperature rise is accompanied by high rolling resistance and fuel consumption and can be the source of damage to the tire. It is therefore desirable to obtain mixtures which generate less heat under these difficult operating conditions in order to avoid premature ageing of the carcass, which must be capable of retread after tread wear. Obtaining such slightly hysteretic mixtures must not, however, be accompanied by deterioration on wear and traction.

By partially or totally replacing the carbon black with silica in a natural rubber-base composition, it is known to the expert that mixtures less hysteretic than those reinforced with carbon black can be obtained and that the use of a coupling agent between the silica and the elastomer makes it possible to limit the interactions between the silica particles which are the source of hysteresis loss (that is, hysteresis) and to improve the reinforcement, in particular, of wear resistance, as described in EP-A-0,501,227.

As silica-elastomer coupling agents of mixtures vulcanizable with sulfur, which are known to the expert, it is possible to mention the alkoxysilanes reactive at one end with silica (silane part) and at the other end with the carbon-carbon double bonds of the diene elastomer, for example, by means of a polysulfide or mercapto group. Such coupling agents can be premixed with silica and possibly grafted on the silica or added during preparation of the mixture, the coupling agents being combined in situ with the silica. Among the coupling agents of this type most used, Si69 can be mentioned, which is the bis-(3-triethoxysilylpropyl) tetrasulfide marketed by Degussa (*Rubber Chem. Technol.*, 1977, Vol. 50, p. 447) or X50S, also marketed by Degussa, which is a 50/50 mixture by weight of Si69 and N330 black.

It is also known to the expert that silanes having an aminoalkyl group are mentioned under the same heading as silanes having methyl or vinyl groups as being not active coupling agents with the diene elastomers (Wagner, *Rubber Chem. and Technol.*, 1976, pp. 703 to 794), for there is no predictable reaction between the amino group and the double bonds of the elastomer. However, in some patents disclosing (i) diene elastomer, (ii) silica and (iii) coupling agent base compositions, it is possible to find cited under the same heading as the sulfo, mercapto or poly-sulfide groups active with the elastomers possessing double bonds, the vinyl, amino and epoxy groups, as, for example, in EP 0,738,613 A1 or U.S. Pat. No. 5,225,011, in which the amino or epoxy alkoxysilanes are described as coupling agents for natural rubber-base compositions possessing as filler a carbon black and silica mix under the same heading as a mercaptoalkoyxysilane and a bisalkoxysilane polysulfide, such as Si69, but obviously not used in the examples given. In fact, it is known to the expert that a vinyl or amino or epoxy group cannot be reactive with the double bonds of a diene elastomer.

However, if an aminoalkyltrialkoxysilane is used, even at very low levels in a composition with majority natural rubber base and a majority silica-type filler, the composition cannot be used, for the scorching mixture (vulcanization lag time almost nil) starts reticulating in the course of the mixing and shaping stages; the use of that mixture, which becomes very hard, and notably its extrudability, is rendered almost impossible on the industrial scale.

On the other hand, the use of alkylalkoxysilanes is known, such as, for example, the hexadecyltrimethoxy and triethoxy silanes, Si 116 and Si216 respectively, marketed by DEGUSSA, free of groups reactive with unsaturated elastomers, but reactive by their alkoxy groups with silica-type fillers, that is, possessing Si—OH groups on the surface, which make it possible to reduce viscosity, improve proccessability and activate the vulcanization of compositions containing one or more polysulfide silanes like Si69 (Technical Information, DEGUSSA AG No. 6000.1 of June 1994). Consequently, an alkyltrialkoxysilane-aminoalkyltrialkoxysilane combination is not therefore envisaged by the expert to increase the almost nil lag time due to the use of aminoalkyltrialkoxysilane.

SUMMARY OF THE INVENTION

The object of the present invention is to provide a rubber composition at least partially reinforced with silica, which can be used on an industrial scale without particular difficulty and which presents an hysteresis less than that of the known compositions containing the most widely used coupling agents, such as Si69 and X50S, while imparting, in the case of a tire casing application, notably in the tread, wear resistance and traction characteristics practically as good or even better than those of the known compositions reinforced with silica or carbon black, a reduction of hysteresis and, consequently, a fuel saving and a prolonged carcass lifetime, because the internal temperature of the tire during rolling remains relatively low.

This object has been obtained, surprisingly, by using in the rubber composition both an aminoalkylalkoxysilane and an alkylalkoxysilane free of any group capable of reacting with the elastomer.

The rubber composition according to the invention is characterized in that it contains:

a) at least one diene elastomer having oxygenated functions;

b) a filler consisting, at least in part, of at least one so-called "silica-type" material chosen in the group formed by the silicas and the materials other than silicas possessing on the surface oxygenated functions of silicon;

c) at least one coupling agent chosen in the group formed by aminoalkyalkoxysilanes, aminoarylalkoxysilanes and aminoaralkyalkoxysilanes, the alkyl, aryl or aralkyl groups can optionally, be substituted by functional groups;

d) at least one coating agent chosen in the group formed by alkylalkoxysilanes, arylalkoxysilanes and aralkylalkoxysilanes, alkyl, aryl or aralkyl groups which can, optionally be substituted by functional groups, except amino or sulfo groups.

The invention also concerns articles containing the composition according to the invention, those articles being, for example, semifinished articles, notably treads for tire casings or finished products, notably, elastic bearings for vehicle suspension systems, such as for connecting the shock absorbers, the rods, arms and struts in suspenion systems, the frames, etc. . . . , and tire casings.

The oxygenated functions of the elastomer can, notably, be carbonyl (aldehyde, ketone), carboxyl (acid) or epoxy functions.

The elastomer with oxygenated functions can be a synthetic diene elastomer, the oxygenated functions being introduced in the polymer on synthesis of the latter or by a subsequent treatment performed on the polymer in order to introduce those functions.

Examples of such synthetic diene elastomers with oxygenated functions include the polyisoprenes, polybutadienes, butadiene-isoprene copolymers (BIR), butadiene-styrene copolymers (SBR) or butadiene-isoprene-styrene terpolymers (SBIR), which are modified:

in the course of synthesis by incorporation, in an emulsion process, of a monomer, like, for example, an alkyl acrylate or methyacrylate converted by subsequent acidification into a carboxyl group or else a glycidyl acrylate or methacrylate which supplies a polymer with epoxy functions along the chain;

or at the end of the chain, on finishing synthesis in organic solution, with, for example, an organolithian catalyst, by use of a compound like a dialkylformamide, which grafts an aldehyde function at the end of the chain;

or on the chain at the end of synthesis through a subsequent treatment be means of reagents like, for example, azocarboxylates or azides substituted with a ketone or acid function.

The diene elastomer with oxygenated functions is preferably natural rubber. In fact, it is known that the latter most frequently contains such functions as a result of an oxidation occurring, for example, on thermomechanical operations carried out in the course of preparation of the elastomer compositions.

The composition can contain one or more of those diene elastomers with oxygenated functions; for example, it can contain a cut of natural rubber and one or more synthetic diene elastomers with oxygenated functions.

The composition can contain only the diene elastomer or elastomers with oxygenated functions, or it can contain, in addition to the elastomer or elastomers with oxygenated functions, one or more diene elastomers free of oxygenated functions, particularly any homopolymer obtained by polymerization of a conjugated diene monomer having 4 to 12 carbons atoms, any copolymer obtained by copolymerization of one or more dienes conjugated with each other or with one or more vinyl-aromatic compounds having 8 to 20 carbon atoms and possibly an acrylonitrile compound.

Suitable conjugated dienes are, notably, 1,3-butadiene, 2-methyl-1,3-butadiene, 2-3-di(alkyl in C1 to C5)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, etc.

Suitable vinylaromatic compounds are, notably, styrene, ortho, meta, paramethylstyrene, the commercial mixture "vinyltoluene," para-tertiobutyl styrene, methoxystyrenes, chlorostyrenes, vinylmesitylene, divinyl benzene, vinylnaphthalene, etc.

The copolymers can contain, for example, between 99% and 20% by weight diene units and 1% to 80% by weight vinyl aromatic units.

The polymers endowed with or free of oxygenated functions can have any microstructure, depending on the polymerization conditions used and, notably, the presence or not of a modifying and/or randomizing agent and of the quantities of modifying or randomizing agent used. The polymers can be block, statistical, sequenced, micro-sequenced, etc., and prepared in dispersion or solution.

What are preferably suitable as synthetic diene elastomers free of oxygenated functions are polybutadienes and, in particular, those having a content in 1,2-units ranging between 4% and 80%, and those have more than 90% cis-1,4-bonds, polyisoprenes, butadiene-styrene copolymers and, in particular, those having a styrene content ranging between 5% and 50% by weight and, in particular, between 20% and 40% by weight, a 1,2-bond content of the butadiene part ranging between 4% and 65%, a trans-1,4-bond content ranging between 30% and 80%, those having an overall aromatic compound content ranging between 5% and 50% and a vitreous transition temperature (Tg) ranging between 0° C. and −80° C. and, in particular, those having a styrene content ranging between 25% and 30% by weight, a vinyl bond content of the butadiene part ranging between 55% and 65%, a trans-1,4-bond content ranging between 20% and 25% and a vitreous transition temperature ranging between −20° C. and −30° C.

In the case of butadiene-styrene-isoprene copolymers, suitable are those having a styrene content ranging between 5% and 50% and, in particular, ranging between 10% and 40%, an isoprene content ranging between 15% and 60% by weight and, in particular, ranging between 20% and 50% by weight, a butadiene content ranging between 5% and 50% and, in particular, ranging between 20% and 40% by weight, a content in 1,2-units of the butadiene part ranging between 4% and 85%, a content in trans- 1,4-units of the butadiene part ranging between 6% and 80%, a content in 1,2 plus 3,4-units of the isoprene part ranging between 5% and 70% and a content in trans-1,4-units of the isoprene part ranging between 10% and 50%.

The polymers free of oxygenated functions can be coupled and/or starred or even functionalized with a coupling and/or starring or functionalizing agent.

The elastomer portion of the composition according to the invention consists of at least 50% by weight of elastomer or elastomers with oxygenated functions, that is, the ratio by weight of the elastomer or elastomers with oxygenated functions and of the elastomer or elastomers free of oxygenated functions exceeds 1. The elastomer portion of the composition according to the invention advantageously consists of at least 50% by weight natural rubber.

In the composition according to the invention, the silica-type material of the filler can be a material other than a silica possessing on the surface oxygenated functions of silicon, such as, for example, a CSDP (Carbon-Silica Dual Phase filler) carbon black having on the surface a carbon phase and a phase consisting of domains where finely divided silica is found. Such a material is, for example, described in Conference No. 24 of the ACS Meeting, Rubber Division, Anaheim, Calif. May 6–9, 1997).

As further examples of materials other than silicas possessing oxygenated functions of silicon on the surface, one can cite the natural aluminosilicates such as sepiolite or the synthetic aluminosilicates precipitated from a solution containing an aluminosilicate or a mixture of aluminate and silicate.

The silica-type material of the filler is advantageously a silica and preferably a precipitated silica. As precipitated silica, one can mention, on the one hand, the commercial silicas whose BET specific surface ranges between 100 and 300 m²/g and, in particular, between 120 and 250 m²/g. As nonlimitative examples of silicas, one can mention the Degussa Ultrasil VN3, Rhône-Poulenc Zeosil 175 MP or Akzo KS404 silicas and, on the other hand, the highly dispersible silicas.

The beneficial effect will be maximal in the composition according to the invention with a highly dispersible silica, that is, any silica having a tendency to deagglomeration and to dispersion in a very appreciable polymer matrix observable by electron microscopy or optical microscopy on fine cuts. The dispersibility of silica is also appreciated by means of an ultrasonic test of tendency to deagglomeration followed by a measurement, by granulometer light diffraction, of the size of the silica particles, in order to determine the median diameter (D50) of the particles and of the deagglomeration factor (Df) after deagglomeration, as described in patent application EP-A 0,520,860 in the article that appeared in the journal *Rubber World,* June 1994, pages 20–24, entitled "Dispersibility Measurements of Prec. Silicas."

As nonlimitative examples of such highly dispersible preferential silicas, one can mention those having a BET specific surface ranging between 120 and 250 m²/g, a CTAB specific surface ranging between 120 and 240 m²/g and, in particular, those described in European patent applications EP-A-0, 157,703 and EP-A-0,520,862, or the Perkasil KS430 silica of the Akzo company, the HI-SIL 2000 silica of the PPG company, the Zeosil 1165 MP silica of the Rhône-Poulenc company, the BV3370GR silica of the Degussa company, and the Zeopol 8741 and 8745 silica of the Huber company.

The CTAB specific surface is determined according to the NFT 45007 method of November 1987. The BET specific surface is determined according to the BRUNAUER, EMMET, TELLER method described in "The Journal of the American Chemical Society," Vol. 60, page 309, February 1938, corresponding to standard NFT 45007 of November 1987.

The filler can contain one or more silica-type materials such as, for example, a mixture of different silicas, a mixture of different CSDP carbon blacks or a mixture of one or more silicas with one or more CDSP carbon blacks or one or more aluminosilicates, but the silica-type filler preferably consists of one or more silicas.

The filler can further contain materials which are not of silica type, such as, for example, carbon black or white fillers other than silica, such as chalk, kaolin or alumina.

Suitable carbon blacks that can be used in the compositions according to the invention are all carbon blacks, notably, all blacks commercially available or conventionally used in tires and, in particular, in tire treads, as well as blacks modified on the surface by grafting of organic radicals. The quantity of carbon black present can vary within broad limits, it being understood, however, that improvement of the properties will be ever greater as the level of silica-type material present rises. The quantity of carbon black, if used, is such that the ratio by weight of silica-type material to black is greater than or equal to 1 and preferably greater than or equal to 2.

The silica-type material or materials preferably represent from 50% to 100% of the total weight of the filler.

By way of example, the filler consists of 50% to 100% by weight of a precipitated silica whose BET specific surface ranges between 100 and 300 m²/g and preferably between 120 and 250 m2/g and of 50% to 0% by weight of carbon black having a BET specific surface ranging between 25 and 160 m²/g.

The filler preferably represents from 30 to 70% by weight in relation to the weight of the elastomer or of all the elastomers. In coupling agent c) of the invention, the alkyl, aryl or aralkyl groups can, if necessary, be substituted by functional groups like, for example, halogens, amino groups, alkoxyls and ethers.

Coupling agent c) of the invention preferably responds to the formula:

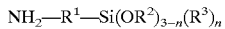

$$NH_2—R^1—Si(OR^2)_{3-n}(R^3)_n$$

in which:

n is 0, 1 or 2;

$R^1$ is a hydrocarbon group containing 1 to 20 carbon atoms;

$OR^2$ is an alkoxy group containing from 1 to 20 and preferably 1 to 5 carbon atoms, $R^2$ being a hydrocarbon group and the $OR^2$ groups, if there are several of them, possibly being identical or different;

$R^3$ is a hydrocarbon group containing from 1 to 20 and preferably 1 to 5 carbon atoms, the $R^3$ groups, if there are two of them, possibly being identical or different.

As examples of such compounds, one can cite the 3-aminopropyltriethoxy (or trimethoxy) silanes, the 2-aminoethyltriethoxy (or trimethoxy) silanes, the 3-aminopropyldiethoxy (or dimethoxy) ethyl silanes, and the 3-aminopropyl monoethoxy (or monomethoxy) dialkyl or diarylsilanes.

The composition can contain only one or more of those coupling agents.

In the composition according to the invention, the ratio between the weight of coupling agent c) or of all of coupling agents c) and the weight of the silica-type material or of all of the silica-type materials ranges preferably between 0.01 and 0.2 and, even more preferably, between 0.02 and 0.1. In covering agent d) of the invention, the alkyl, aryl or aralkyl groups can, if necessary, be substituted by functional groups, except for amino or sulfo groups, such as, for example, halogens, alkoxyl groups or ethers.

Covering agent d) preferably responds to the formula:

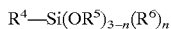

$$R^4—Si(OR^5)_{3-n}(R^6)_n$$

in which:

n is 0, 1 or 2;

$R^4$ is a hydrocarbon group containing from 1 to 20 and preferably 10 to 20 carbon atoms;

$OR^5$ is an alkoxy group containing from 1 to 20 carbon atoms, the $R^5$ group being a hydrocarbon group and the $OR^5$ groups, if there are several of them, possibly being identical or different;

$R^6$ is a hydrocarbon group containing from 1 to 20 carbon atoms, the $R^6$ groups, if there are two of them, possibly being identical or different.

As examples of covering agent d), one can cite the penta (or hexa or octa) decyltriethoxy (or trimethoxy) silanes, the penta (or hexa or octa) decyldiethoxy (or dimethoxy) methyl or ethyl silanes, and the penta (or hexa or octa) decyl monoethoxy (or monomethoxy) methyl or ethyl silanes. In the composition according to the invention, the ratio between the weight of covering agent d) or all of covering agents d) and the weight of the silica-type material or all of the silica-type materials ranges preferably between 0.01 and 0.2 and, even more preferably, between 0.02 and 0.1.

The composition according to the invention can reticulate under the action of sulfur peroxides, and bismaleimides with or without sulfur under the action of other reticulating agents, or it can be free of a reticulating system, if it contains thermoplastic elastomers.

The composition according to the invention can also contain the other constituents and additives ordinarily used in rubber mixtures, like plasticizers, pigments, antioxidants, reticulation accelerators, extender oils, coupling agents other than aminoalkylalkoxy-silane(s) and/or covering agents other than alkylalkoxysilane(s). Preferably, if there are coupling agents in the composition other than aminoalkylalkoxysilane(s) and/or covering agents other than alkylalkoxysilane(s), the weight of those agents is less than the weight of the aminoalkylalkoxysilane(s) or alkylalkoxysilane(s), respectively.

The composition of the invention can be prepared according to known processes of thermomechanical working of the constituents in one or more stages. It can be obtained, for example, by a thermo-mechanical operation in one stage in an internal mixer lasting 6 to 10 minutes at an average pallet speed of 50 revolutions per minute, until a fall temperature of 170° C. is reached, or in two stages in an internal mixer lasting 4 to 6 minutes and 3 to 5 minutes respectively, until a maximum fall temperature of 170° C. is reached, followed by a finishing stage carried out at 80° C., during which sulfur and accelerator are incorporated, in the case of a composition vulcanizable with sulfur.

The composition according to the invention can, for example, be used to constitute tire treads containing a surface layer in contact with the ground and a sublayer positioned between the surface layer and the wire cord plies. The composition of the surface layer, which must stand up to the attacks of the pavement and to wear, in particular, has higher filler levels than the sublayer, which has to be very slightly hysteretic and for which a slight reinforcing combination of silica and carbon black of the 500, 600 or 700 series, such as N683 or N765 blacks, for example, is particularly suitable.

DESCRIPTION OF PREFERRED EMBODIMENTS

The invention is illustrated by the following examples, which should not constitute a limitation on the scope of the invention.

In all the examples, unless otherwise indicated, the compositions are given in parts by weight.

In those examples, which may or may not conform to the invention, the properties of the compositions are evaluated as follows, as well as by the aforementioned tests:

Mooney Viscosity

Mooney ML (1+4) viscosity is measured at 100° C. according to standard ASTM D-1646.

Rheometry

The measurements of rheometry are carried out by torque measurements on a Monsanto model 100S rheometer and they are intended to follow the vulcanization process by determining time To in minutes corresponding to the vulcanization lag and time T99 in minutes corresponding to 99% of the maximum torque measured.

Shore Hardness

Shore A hardness is measured at 23° according to standard ASTM 2240-91.

Moduli of Elasticity

The moduli of elasticity are measured at 100% (MA100) and at 300% (MA300) according to standard IS037-1977.

The MA300/MA100 ratio is an elastomer/filler interaction index and a reinforcement index: in fact, when that ratio increases, the abrasion and attack resistance of the compositions are improved.

Scott Breaking Indices

These indices are measured at 23° C. The breaking load (BL) is determined by MPa and the elongation at rupture (ER) in %.

Hysteresis Losses (HL)

The hysteresis losses (HL), or hysteresis, are measured by resilience at 23° C. and at 60° C. according to standard ISO R17667 and expressed in %.

Flexometer Measurements

The increase in temperature T2–T1 in °C. is determined with the flexometer according to standard ASTM D623. It characterizes the heating of the material under mechanical stress.

Dynamic Properties at 23° C.

The elastic modulus E' is determined by MPa characterizing the rigidity as well as the delta tangent (del tg), which is the maximum tangent of the loss angle and characterizes hysteresis. These measurements are carried out according to standard ASTM-D22371-71.

Abrasion

The measurement of abrasion is made by relative loss of volume according to standard DIN 53-516.

EXAMPLE 1

This example is intended to compare natural rubber compositions with the Ultrasil VN3 silica filler of Degussa. Said compositions are given in Table 1. They employ, in the case of Test 1, a combination of aminopropyltriethoxysilane A 1100 and hexadecyl-trimethoxysilane Si116, in the case of Test 2, A 1100 alone, in the case of Test 3, Si116 alone, and in the case of Test 4, the standard coupling agent Si69. Test 1 therefore conforms to the invention, and Tests 2 to 4 are comparative tests not conforming to the invention, Test 4 being representative of a known composition serving as reference. All these compositions are vulcanizable with sulfur.

The characteristics of the constituents are as follows:
Peptized natural rubber of Mooney ML 1+4 at 100° C. equal to 60
Ultrasil VN3 silica of Degussa of CTAB specific surface 164 $m^2/g$, of median particle diameter after deagglomeration D50=$8\mu$ and of deagglomeration factor Df=3 ml
Degussa's liquid silane Si69
Union Carbide's aminopropyltriethoxysilane A 1100
Degussa's hexadecyltrimethoxysilane Si116
Antioxidant: N-(1,3-dimethylbutyl) N'-phenyl-p-phenylene diamine
Paraffin: mixture of macro- and microcrystalline waxes
Sulfenamide: N-cyclohexyl-2-benzothiazyl sulfenamide
The compositions of Tests 1 to 4 are obtained by use of all the ingredients, except sulfur and accelerator, by 1-stage thermomechanical operation in an internal mixer which lasts approximately 7 minutes with an average pallet speed of 50 revolutions per minute until reaching a fall temperature of 170° C., followed by a finishing stage carried out at 80° C., during which the sulfur and accelerator are incorporated.

TABLE 1

| Composition | Test 1 | Test 2 | Test 3 | Test 4 |
| --- | --- | --- | --- | --- |
| Natural rubber | 100 | 100 | 100 | 100 |
| Ultrasil VN3 silica | 50 | 50 | 50 | 50 |
| Si69 | — | — | — | 5 |
| A1100 | 2.05 | 4.1 | — | — |
| Si116 | 3.2 | — | 6.4 | — |
| Zinc oxide | 3 | 3 | 3 | 3 |
| Stearic acid | 2.5 | 2.5 | 2.5 | 2.5 |
| Antioxidant | 1.5 | 1.5 | 1.5 | 1.5 |
| Paraffin | 1 | 1 | 1 | 1 |
| Sulfur | 2 | 2 | 2.4 | 1.1 |
| Sulfenamide | 2.66 | 3.00 | 3.2 | 1.45 |

In each test, the silanes are used with the same overall level of trialkoxysilane functions, so as to compare the mixtures having the same silica filler coating. The levels of sulfur and sulfenamide are adjusted so as to obtain mixtures of close Shore hardnesses in order to facilitate comparisons of the hysteretic properties of the mixtures.

Vulcanization is carried out at 150° C. during time T99 in minutes, which is given in Table 2.

The properties of those four compositions are compared with each other in unvulcanized state as well as in vulcanized state. The results are set forth in Table 2.

It is observed that the composition of Test 2, in which the A 1100 silane is used alone, possesses raw a very high Mooney value not measurable and a very slight vulcanization lag time (To of 1 minute). Such a composition supplies mixtures too hard and too scorching to be used in an industrial installation.

The composition of Test 3, which uses Si116 alone, has a low 300% modulus with, consequently, an elastomer-filler interaction, characterized by the very low MA300/MA100 ratio and an insufficient reinforcement, as the abrasion results show.

The comparisons of Tests 1 and 4 give the following information:
- the lag time is practically the same (To of 8 minutes, compared to 9 minutes), which provides similar safety of use;
- the hysteresis levels of Test 1 (HL at 23 and 60° C., flexometer heating and tg del in dynamic properties) is far below that of Test 4 for an equivalent Shore hardness;
- the reinforcement properties, given by the MA300/MA100 ratio and by the Scott breaking indices, are better for Test 1;
- the abrasion characteristics are equivalent.

This set of results therefore makes it possible to predict with the composition of Test 1 according to the invention, by comparison with the standard composition of Test 4 including coupling agent Si69, the production of tire casing treads having lower rolling resistance and heating with, consequently, a fuel saving and a longer lifetime of the casing, without detriment to the attack and wear resistance characteristics.

TABLE 2

| Composition | Test 1 | Test 2 | Test 3 | Test 4 |
| --- | --- | --- | --- | --- |
| Silanes | A1100 +Si116 | A1100 | Si116 | Si69 |
| Standard properties of rubber products | | | | |
| Mooney Rheometer 150° C. | 77 | hard | 44 | 53 |
| Lag time To (min) | 8 | 1 | 19 | 9 |
| T99, minutes | 14 | 5 | 32 | 39 |
| Properties in vulcanized state | | | | |
| Shore hardness A | 57.3 | 63.2 | 58.8 | 58.9 |
| MA100 | 1.45 | 1.73 | 1.58 | 1.41 |
| MA300 | 1.52 | 2.07 | 1.20 | 1.26 |
| MA300/MA100 | 1.05 | 1.19 | 0.75 | 0.89 |
| Scott breaking index at | | | | |
| 23° C. BL | 30 | 31 | 25 | 26 |
| 23° C. ER % | 645 | 594 | 618 | 624 |
| HL at 23° C. | 15.4 | 19.6 | 15.9 | 25.4 |
| HL at 60° C. | 12.1 | 16.5 | 13.2 | 19.5 |
| Flexometer T2-T1 (° C.) | 11 | 20 | 14 | 21 |
| Dynamic properties at 23° C. | | | | |
| E' in MPa | 2.28 | 3.56 | 2.31 | 3.57 |
| del tg | 0.074 | 0.097 | 0.071 | 0.123 |
| DIN abrasion | 99 | 92 | 129 | 100 |

EXAMPLE 2

In Example 2, the four compositions of Example 1 have been reproduced along with the method of obtaining them by replacing the Ultrasil VN3 silica with Zeosil 1165 MP silica, the dispersibility of which is improved. After ultrasonic deagglomeration, this silica of CTAB specific surface 160 m$^2$/g has a median diameter of particles D50 equal to 5$\mu$ and a deagglomeration factor Df equal to 8 ml.

Test 5 conforms to the invention, Tests 6 to 8 being control tests, Test 8 serving as reference for the same reasons as Test 4 of Example 1.

Vulcanization is carried out at 150° C. during the time T99 in minutes given in Table 3.

The properties of these four compositions are compared with each other in unvulcanized state as well as in vulcanized state. The results are set forth in Table 3.

This Example 2 makes possible findings analogous to those of Example 1, on comparing the Test 5 conforming to the invention to control Tests 6 to 8.

TABLE 3

| Composition | Test 5 | Test 6 | Test 7 | Test 8 |
| --- | --- | --- | --- | --- |
| Silanes | A1100 +Si116 | A1100 | Si116 | Si69 |
| Standard properties of rubber products | | | | |
| Mooney Rheometer 150° C. | 70 | hard | 39 | 48 |
| Lag time To (min) | 9 | 1 | 12 | 9 |
| T99, minutes | 17 | 4 | 25 | 35 |
| Properties in vulcanized state | | | | |
| Shore hardness A | 57.6 | 61.6 | 59.6 | 60.7 |
| MA100 | 1.49 | 1.62 | 1.49 | 1.49 |

TABLE 3-continued

| Composition | Test 5 | Test 6 | Test 7 | Test 8 |
|---|---|---|---|---|
| MA300 | 1.52 | 2.13 | 1.13 | 1.46 |
| MA300/MA100 | 1.02 | 1.31 | 0.76 | 0.98 |
| Scott breaking index at | | | | |
| 23° C. BL | 30 | 30 | 26 | 28 |
| 23° C. BR % | 623 | 578 | 615 | 638 |
| HL at 23° C. | 14.7 | 18.0 | 17.9 | 25.4 |
| HL at 60° C. | 12.1 | 14.9 | 14.3 | 18.7 |
| Flexometer T2-T1 (° C.) | 10 | 15 | 14 | 19 |
| Dynamic properties at 23° C. | | | | |
| E' in MPa | 2.31 | 3.99 | 2.45 | 4.05 |
| del tg | 0.075 | 0.100 | 0.084 | 0.139 |
| DIN abrasion | 105 | 96 | 122 | 100 |

EXAMPLE 3

In this Example 3, the 4 compositions of Example 2 with Zeosil 1165 MP silica have been reproduced along with the methods of obtaining them by replacing natural rubber with a mixture of natural rubber and cis-1,4-polybutadiene with a natural rubber to polybutadiene ratio by weight of 70/30.

Test 9 conforms to the invention and Tests 10 to 12 are comparative, Test 12 being the reference test for the same reasons as in Example 1.

The characteristics of the 1,4-polybutadiene prepared in solution with a titanium-base catalyst are as follows:

cis-1,4 level: 92%,

Mooney viscosity: 45

Vulcanization is carried out at 150° C. during the time T99 in minutes given in Table 4.

The properties of these four compositions are compared with each other in unvulcanized state as well as in vulcanized state. The results are set forth in Table 4.

Example 3 makes possible findings analogous to those of Example 1, on comparing the Test 9 conforming to the invention to control Tests 10 to 12.

TABLE 4

| Composition | Test 9 | Test 10 | Test 11 | Test 12 |
|---|---|---|---|---|
| Silanes | A1100 +Si116 | A1100 | Si116 | Si69 |
| Standard properties of rubber products | | | | |
| Mooney Rheometer 150° C. | 69 | 128 | 40 | 50 |
| Lag time To (min) | 11 | 2 | 18 | 11 |
| T99, minutes | 20 | 6 | 32 | 47 |
| Properties in vulcanized state | | | | |
| Shore hardness A | 57.8 | 62.9 | 59.0 | 62.3 |
| MA100 | 1.41 | 1.70 | 1.48 | 1.58 |
| MA300 | 1.24 | 1.82 | 1.06 | 1.39 |
| MA300/MA100 | 0.88 | 1.07 | 0.72 | 0.88 |
| Scott breaking index at | | | | |
| 23° C. BL | 22 | 25 | 13 | 25 |
| 23° C. ER % | 601 | 611 | 493 | 685 |
| HL at 23° C. | 18.9 | 19.8 | 20.6 | 30.6 |
| HL at 60° C. | 14.5 | 16.4 | 15.6 | 22.4 |

TABLE 4-continued

| Composition | Test 9 | Test 10 | Test 11 | Test 12 |
|---|---|---|---|---|
| Dynamic properties at 23° C. | | | | |
| E' in MPa | 3.02 | 5.27 | 2.84 | 4.99 |
| del tg | 0.094 | 0.112 | 0.090 | 0.153 |

EXAMPLE 4

In Example 4, the 4 compositions of Example 2 with Zeosil 1165 MP silica have been reproduced along with the methods of obtaining them by replacing the Zeosil 1165 MP silica with a mixture of Zeosil 1165 MP silica and N234 carbon black with a silica to carbon black ratio by weight equal to 35/15.

The silane levels have been adjusted to the new silica levels. The compositions are given in Table 5.

TABLE 5

| Composition | Test 13 | Test 14 | Test 15 | Test 16 |
|---|---|---|---|---|
| Natural rubber | 100 | 100 | 100 | 100 |
| Zeosil 1165MP silica | 35 | 35 | 35 | 35 |
| N234 black | 15 | 15 | 15 | 15 |
| Si69 | — | — | — | 3.5 |
| A1100 | 1.43 | 2.87 | — | — |
| Si116 | 2.24 | — | 4.48 | — |
| Zinc oxide | 3 | 3 | 3 | 3 |
| Stearic acid | 2.5 | 2.5 | 2.5 | 2.5 |
| Antioxidant | 1.5 | 1.5 | 1.5 | 1.5 |
| Paraffin | 1 | 1 | 1 | 1 |
| Sulfur | 2 | 2 | 2.4 | 1.1 |
| Sulfenamide | 2.66 | 2.80 | 3.20 | 1.45 |

Test 13 conforms to the invention and Tests 14 to 16 are comparative, Test 16 being the reference test, for the same reasons as in Example 1.

Vulcanization is carried out at 150° C. during the time T99 in minutes given in Table 6.

The properties of these four compositions are compared with each other in unvulcanized state as well as in vulcanized state. The results are set forth in Table 6.

Example 4 makes possible findings analogous to those of Example 1, on comparing the Test 13 conforming to the invention to control Tests 14 to 16.

TABLE 6

| Composition | Test 13 | Test 14 | Test 15 | Test 16 |
|---|---|---|---|---|
| Silanes | A1100 | A1100 | Si116 | Si69 |
| Standard properties of rubber products | | | | |
| Mooney Rheometer 150° C. | 60 | 82 | 40 | 48 |
| Lag time To (min) | 7 | 3 | 7 | 7 |
| T99, minutes | 15 | 7 | 15 | 26 |
| Properties in vulcanized state | | | | |
| Shore hardness A | 62 | 63 | 66 | 61 |
| MA100 | 2.05 | 2.23 | 2.28 | 1.61 |
| MA300 | 2.28 | 2.82 | 2.22 | 1.70 |
| MA300/MA100 | 1.11 | 1.26 | 0.97 | 1.05 |

TABLE 6-continued

| Composition | Test 13 | Test 14 | Test 15 | Test 16 |
|---|---|---|---|---|
| Scott breaking index at | | | | |
| 23° C. BL | 29 | 31 | 26 | 29 |
| 23° C. BR % | 552 | 530 | 500 | 625 |
| HL at 23° C. | 15.9 | 15.7 | 18.7 | 27.3 |
| HL at 60° C. | 12.1 | 12.3 | 13.8 | 18.6 |
| Dynamic properties at 23° C. | | | | |
| E' in MPa | 2.78 | 3.40 | 3.18 | 3.64 |
| del tg | 0.086 | 0.092 | 0.085 | 0.143 |
| DIN abrasion | 110 | 105 | 135 | 100 |

EXAMPLE 5

In Example 5, the 4 compositions of Example 4 with the cut of Zeosil 1165 MP silica and N234 carbon black have been reproduced along with the methods of obtaining them by replacing the natural rubber with a mixture of natural rubber and cis-1,4-polybutadiene in a ratio by weight of natural rubber to cis-1,4-polybutadiene equal to 70/30.

The characteristics of the cis-1,4-polybutadiene prepared in solution with a titanium-base catalyst are supplied in Example 3.

The compositions are given in Table 7.

TABLE 7

| Composition | Test 17 | Test 18 | Test 19 | Test 20 |
|---|---|---|---|---|
| Natural rubber | 70 | 70 | 70 | 70 |
| cis-1,4-Polybutadiene | 30 | 30 | 30 | 30 |
| Zeosil 1165MP silica | 35 | 35 | 35 | 35 |
| N234 black | 15 | 15 | 15 | 15 |
| Si69 | — | — | — | 3.5 |
| A1100 | 1.43 | 2.87 | — | — |
| Si116 | 2.24 | — | 4.48 | — |
| Zinc oxide | 3 | 3 | 3 | 3 |
| Stearic acid | 2.5 | 2.5 | 2.5 | 2.5 |
| Antioxidant | 1.5 | 1.5 | 1.5 | 1.5 |
| Paraffin | 1 | 1 | 1 | 1 |
| Sulfur | 2 | 2 | 2.4 | 1.1 |
| Sulfenamide | 2.66 | 2.80 | 3.20 | 1.45 |

Test 17 conforms to the invention and Tests 18 to 20 are comparative, Test 206 being the reference test, for the same reasons as in Example 1.

Vulcanization is carried out at 150° C. during the time T99 in minutes given in Table 8.

The properties of these four compositions are compared with each other in unvulcanized state as well as in vulcanized state. The results are set forth in Table 8.

Example 5 makes possible findings analogous to those of Example 1, on comparing the Test 17 conforming to the invention to control Tests 18 to 20.

TABLE 8

| Composition | Test 17 | Test 18 | Test 19 | Test 20 |
|---|---|---|---|---|
| Silanes | A1100+Si116 | A1100 | Si116 | Si69 |
| Standard properties of rubber products | | | | |
| Mooney Rheometer 150° C. | 60 | 90 | 42 | 50 |
| Lag time To (min) | 7 | 4 | 7 | 8 |
| T99, minutes | 15 | 9 | 16 | 31 |
| Properties in vulcanized state | | | | |
| Shore hardness A | 64 | 65 | 65 | 63 |
| MA100 | 2.05 | 2.14 | 2.15 | 1.65 |
| MA300 | 2.04 | 2.48 | 1.97 | 1.54 |
| MA300/MA100 | 1.00 | 1.16 | 0.92 | 0.93 |
| Scott breaking index at | | | | |
| 23° C. BL | 23 | 24 | 17 | 26 |
| 23° C. ER % | 504 | 486 | 424 | 606 |
| HL at 23° C. | 19.4 | 19.1 | 20.0 | 28.8 |
| HL at 60° C. | 14.3 | 15.0 | 14.4 | 21.5 |
| Dynamic properties at 23° C. | | | | |
| E' in MPa | 3.41 | 4.38 | 3.54 | 3.98 |
| del tg | 0.094 | 0.110 | 0.091 | 0.147 |

EXAMPLE 6

In this, example different compositions are compared, containing natural rubber alone or mixed with another diene rubber, as well as silica alone or in mixture with carbon black.

These compositions are given in Table 9.

The characteristics of Hi-Sil 2000 silica, which is the only new constituent, are as follows:

CTAB specific surface: 214 m²/g, after ultrasonic deagglomeration, median diameter of particle D50=9 microns and deagglomeration factor Df=2 ml.

The compositions of Tests 21 to 28 are used in a one-stage operation, as in Example 1.

TABLE 9

| Composition | Test 21 | Test 22 | Test 23 | Test 24 | Test 25 | Test 26 | Test 27 | Test 28 |
|---|---|---|---|---|---|---|---|---|
| Natural rubber | 100 | 100 | 70 | 70 | 100 | 100 | 70 | 70 |
| cis-1,4-Polybutadiene | — | — | 30 | 30 | — | — | 30 | 30 |
| Hi-Sil 2000 silica | 40 | 40 | 40 | 40 | 27 | 27 | 27 | 27 |
| N234 black | — | — | — | — | 13 | 13 | 13 | 13 |
| Si69 silane | — | 5 | — | 5 | — | 3.5 | — | 3.5 |
| A1100 silane | 2.05 | — | 2.05 | — | 1.43 | — | 1.43 | — |
| Si116 silane | 3.20 | — | 3.2 | — | 2.24 | — | 2.24 | — |

TABLE 9-continued

| Composition | Test 21 | Test 22 | Test 23 | Test 24 | Test 25 | Test 26 | Test 27 | Test 28 |
|---|---|---|---|---|---|---|---|---|
| Zinc oxide | 3 | 3 | 3 | 3 | 3 | 3 | 3 | 3 |
| Stearic acid | 2.5 | 2.5 | 2.5 | 2.5 | 2.5 | 2.5 | 2.5 | 2.5 |
| Antioxidant | 1.5 | 1.5 | 1.5 | 1.5 | 1.5 | 1.5 | 1.5 | 1.5 |
| Paraffin | 2 | 2 | 2 | 2 | 2 | 2 | 2 | 2 |
| Sulfur | 2.00 | 1.10 | 2.00 | 1.10 | 2.00 | 1.10 | 2.00 | 1.10 |
| Sulfenamide | 2.66 | 1.45 | 2.66 | 1.45 | 2.66 | 1.45 | 2.66 | 1.45 |

Compositions 21, 23, 25 and 27 conform to the invention, compositions 22, 24, 26 and 28 being the control compositions with coupling agent Si69.

In each test, the silanes are used with the same overall level of trialkoxysilane functions in relation to the surface unit of silica used and in number ratios of trialkoxysilane groups per unit of silica surface identical to those of Example 1. The levels of sulfur and accelerator are adjusted so as to obtain mixtures of close Shore hardnesses in order to facilitate comparisons of the hysteretic properties.

Vulcanization is carried out at 150° C. during time T99 in minutes, which is given in Table 10.

The properties of the compositions of test pairs 21 and 22, 23 and 24, 25 and 26 and, finally, 27 and 28 are compared with each other in unvulcanized state as well as in vulcanized state. The results are set forth in Table 10.

It is observed that the variations of properties of the compositions with the A1100-Si116 combination according to the invention, in relation to the controls with Si69, are comparable to those previously observed in the case of silicas of less CTAB specific surface.

The combination of an aminoalkyltrialkoxysilane with an alkyltrialkoxysilane therefore makes it possible, with a silica of CTAB specific surface of approximately 200 $m^2/g$, to have available compositions with a safety of use comparable to that of the control employing the standard coupling agent Si69 with a much lower hysteresis level, which enables tire treads to be made with a fuel economy and lower heating favorable to improvement of the lifetime of the tire.

TABLE 10

| Composition | Test 21 | Test 22 | Test 23 | Test 24 | Test 25 | Test 26 | Test 27 | Test 28 |
|---|---|---|---|---|---|---|---|---|
| Standard properties of rubber products | | | | | | | | |
| Mooney | hard | hard | 84 | 63 | 71 | 59 | 74 | 57 |
| Rheometer 150° C. | | | | | | | | |
| Lag time To (min) | 4 | 10 | 6 | 11 | 5 | 6 | 5 | 7 |
| T99, minutes | 7 | 32 | 12 | 37 | 10 | 19 | 11 | 27 |
| Properties in vulcanized state | | | | | | | | |
| Shore hardness A | 64 | 64 | 66 | 63 | 66 | 62 | 65 | 62 |
| MA100 | 2.17 | 2.18 | 2.34 | 1.95 | 2.85 | 1.95 | 2.58 | 1.88 |
| MA300 | 1.75 | 1.69 | 1.75 | 1.52 | 2.59 | 1.71 | 2.23 | 1.60 |
| MA300/MA100 | 0.81 | 0.77 | 0.75 | 0.78 | 0.91 | 0.87 | 0.86 | 0.85 |
| Scott breaking index at | | | | | | | | |
| 23° C. BL | 29 | 20 | 19 | 16 | 30 | 22 | 18 | 19 |
| 23° C. ER % | 620 | 513 | 560 | 560 | 564 | 540 | 470 | 580 |
| HL at 23° C. | 20.7 | 25.0 | 17.4 | 26.1 | 16.0 | 25.5 | 15.0 | 25.0 |
| HL at 60° C. | 16.5 | 18.5 | 13.4 | 20.5 | 12.3 | 18.9 | 11.3 | 19.1 |
| Dynamic properties at 23° C. | | | | | | | | |
| E' in MPa | 2.66 | 2.98 | 2.69 | 3.10 | 2.82 | 2.72 | 2.84 | 3.01 |
| del tg | 0.059 | 0.099 | 0.062 | 0.112 | 0.060 | 0.107 | 0.065 | 0.113 |
| DIN abrasion | 103 | 100 | — | — | 100 | 94 | — | — |

In summary, the composition of the invention makes possible the following advantages, when compared to the known rubber and silica-base compositions, which use the most efficient coupling agents of the silane family:

a lower hysteresis loss, which is manifested by less rolling resistance and heating, particularly in the tread of the tires;

better reinforcement properties.

These advantages are obtained without degradation of the conditions of use or of the abrasion characteristics.

EXAMPLE 7

In this example, different compositions according to the invention, containing natural rubber as well as silica alone or in mixture with fine carbon black, are compared with the usual control compositions for elastic bearings used in vehicle suspension systems.

The compositions of the tests according to the invention are those previously described under test numbers 5, 21 and 25. The control compositions are those described for tests 29, 30 and 31 and contain coarse reinforcing fillers. All these compositions are set forth in Table 11.

TABLE 11

| Composition | Test 5 | Test 21 | Test 25 | Test 29 | Test 30 | Test 31 |
|---|---|---|---|---|---|---|
| Natural rubber | 100 | 100 | 100 | 100 | 100 | 100 |
| Ultrasil 360 silica | — | — | — | — | 60 | 20 |
| Zeosil 1165 MP silica | 50 | — | — | — | — | — |
| Hi-Sil 2000 silica | — | 40 | 27 | — | — | — |
| Si69 | — | — | — | — | 1.8 | 0.6 |
| N234 black | — | — | 13 | — | — | — |
| N765 black | — | — | — | 43 | — | 25 |
| A1100 | 2.05 | 2.05 | 1.43 | — | — | — |
| Si116 | 3.2 | 3.2 | 2.24 | — | — | — |
| Zinc oxide | 3 | 3 | 3 | 5 | 5 | 5 |
| Stearic acid | 2.5 | 2.5 | 2.5 | 2 | 2 | 2 |
| Antioxidant | 1.5 | 1.5 | 1.5 | 1.5 | 1.5 | 1.5 |
| Paraffin | 1 | 1 | 1 | 1 | 1 | 1 |
| Sulfur | 2 | 2 | 2 | 2.5 | 2.5 | 2.5 |
| Sulfenamide | 2.66 | 2.66 | 2.66 | 2.1 | 2.1 | 2.1 |
| Properties in vulcanized state | | | | | | |
| Shore hardness A | 58 | 64 | 66 | 63 | 65 | 64 |
| Scott breaking index at | | | | | | |
| 23° C. BL | 30 | 29 | 30 | 20 | 22 | 19 |
| 23° C. ER % | 623 | 620 | 564 | 482 | 507 | 410 |
| Dynamic properties at 23° C. | | | | | | |
| E' in MPa | 2.31 | 2.66 | 2.82 | 2.28 | 2.72 | 2.34 |
| del tg | 0.075 | 0.059 | 0.060 | 0.083 | 0.084 | 0.062 |

The results show that the compositions according to the invention, which include fine reinforcing fillers, possess, in addition to improved hysteretic properties, a level of reinforcement far superior to that of the control compositions, materialized by higher Scott breaking indices.

The invention is, of course, not limited to the working examples previously described, on the basis of which other embodiments can be envisaged.

I claim:

1. A rubber composition comprising:
   a) at least one diene elastomer having oxygenated functions;
   b) a filler containing, at least in part, at least one so-called "silica-type" material selected from the group consisting of the silicas and the materials other than silicas possessing on the surface oxygenated functions of silicon;
   c) at least one coupling agent selected from the group consisting of aminoalkyalkoxysilanes, aminoarylalkoxysilanes and aminoaralkyalkoxysilanes, the alkyl, aryl or aralkyl groups can, optionally, be substituted by functional groups;
   d) at least one covering agent selected from the group consisting of alkylalkoxysilanes, arylalkoxysilanes and aralkylalkoxysilanes, the alkyl, aryl or aralkyl groups can, optionally, be substituted by functional groups, except amino or sulfo groups.

2. A composition according to claim 1, in which the diene elastomer with oxygenated functions is a synthetic elastomer, those functions being introduced in the polymer on synthesis of the latter or by a subsequent treatment performed on the polymer in order to introduce those functions.

3. A composition according to claim 1, in which the diene elastomer with oxygenated functions is natural rubber.

4. A composition according to claim 3, in which the natural rubber represents 50% to 100% by weight of the oxygenated elastomer or elastomers.

5. A composition according to claim 1, in that it further comprises one or more diene elastomers free of oxygenated functions.

6. A composition according to claim 5, in which the ratio by weight of the diene elastomer(s) with oxygenated functions and of the diene elastomer(s) free of oxygenated functions is greater than 1.

7. A composition according to claim 1, in which the silica-type material is a CSDP (Carbon-Silica Dual Phase filler) carbon black having on the surface a carbon phase and a phase containing domains of finely divided silica and/or an aluminosilicate.

8. A composition according to claim 1, in which the silica-type material is precipitated silica.

9. A composition according to claim 1, in which the silica-type material or materials represent(s) 50% to 100% of the total weight of the filler.

10. A composition according to claim 9, in which the filler comprises 50% to 100% by weight of a precipitated silica, whose BET specific surface ranges between 100 and 300 m²/g and preferably between 120 and 250 m²/g, and of 50% to 0% by weight of carbon black.

11. A composition according to claim 1, characterized in that the filler represents 30 to 70% by weight in relation to the weight of the elastomer or all the elastomers.

12. A composition according to claim 1, in which the coupling agent responds to the formula:

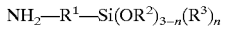

$$NH_2—R^1—Si(OR^2)_{3-n}(R^3)_n$$

in which:
   n is 0, 1 or 2;
   $R^1$ is a hydrocarbon group containing 1 to 20 carbon atoms;
   $OR^2$ is an alkoxy group containing from 1 to 20 and preferably 1 to 5 carbon atoms, $R^2$ being a hydrocarbon group and the $OR^2$ groups, if there are several of them, possibly being identical or different;
   $R^3$ is a hydrocarbon group containing from 1 to 20 and preferably 1 to 5 carbon atoms, the $R^3$ groups, if there are two of them, possibly being identical or different.

13. A composition according to claim 1, in which the covering agent responds to the formula:

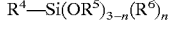

$$R^4—Si(OR^5)_{3-n}(R^6)_n$$

in which:
   n is 0, 1 or 2;
   $R^4$ is a hydrocarbon group containing from 1 to 20 and preferably 10 to 20 carbon atoms;
   $OR^5$ is an alkoxy group containing from 1 to 20 carbon atoms, the $R^5$ group being a hydrocarbon group and the $OR^5$ groups, if there are several of them, being identical or different;
   $R^6$ is a hydrocarbon group containing from 1 to 20 carbon atoms, the $R^6$ groups, if there are two of them, being identical or different.

14. A composition according to claim 1, in which the ratio between the weight of the coupling agent or all of coupling agents and the weight of the silica-type material or all of the silica-type materials ranges between 0.01 and 0.2 and preferably between 0.02 and 0.1.

15. A composition according to claim 1, in which the ratio between the weight of the covering agent or all of covering agents and the weight of the silica-type material or all of the silica-type materials ranges between 0.01 and 0.2 and preferably between 0.02 and 0.1.

16. An article containing at least one composition according to claim 1.

17. An article according to claim 16, which is a tread.

18. An article according to claim 16, which is a tire casing.

19. An article according to claim 16, which is an elastic bearing for vehicle suspension systems.

* * * * *

UNITED STATES PATENT AND TRADEMARK OFFICE
CERTIFICATE OF CORRECTION

PATENT NO. : 6,211,278 B1
DATED : April 3, 2001
INVENTOR(S) : Vanel

It is certified that error appears in the above-identified patent and that said Letters Patent is hereby corrected as shown below:

Title page,
Item [73] Assignee: "Generale" should read -- Générale --

Column 1,
Line 24, "ageing" should read -- aging --

Column 2,
Line 22, "proccessability" should read -- processability --
Line 59, "aminoalkyalkoxysilanes" should read -- aminoalkylalkoxysilanes --
Line 60, "aminoaralkyalkoxysilanes" should read -- aminoaralkylalkoxysilanes --
Line 61, "can optionally," should read -- can, optionally, --
Line 66, "can, optionally" should read -- can, optionally, --

Column 3,
Line 5, "suspenion" should read -- suspension --
Line 22, "methyacrylate" should read -- methylacrylate --
Line 55, "2-3-di(alkyl" should read -- 2,3-di(alkyl --

Column 4,
Line 11, "have" should read -- having --

Column 17,
Line 55, "aminoalkyalkoxysilanes" should read -- aminoalkylalkoxysilanes --
Line 56, "aminoaralkoxysilanes" should read -- aminoaralkylalkoxysilanes --

UNITED STATES PATENT AND TRADEMARK OFFICE
CERTIFICATE OF CORRECTION

PATENT NO. : 6,211,278 B1
DATED : April 3, 2001
INVENTOR(S) : Vanel

It is certified that error appears in the above-identified patent and that said Letters Patent is hereby corrected as shown below:

Column 18,
Line 67, "covering" should read -- the covering --

Column 19,
Line 5, "covering" should read -- the covering --

Signed and Sealed this

Fifth Day of March, 2002

Attest:

Attesting Officer

JAMES E. ROGAN
Director of the United States Patent and Trademark Office